Dec. 6, 1932.  I. K. FULLER  1,890,255
PROCESS OF TREATING SPENT ADSORBENTS
Filed Sept. 27, 1929   2 Sheets-Sheet 2

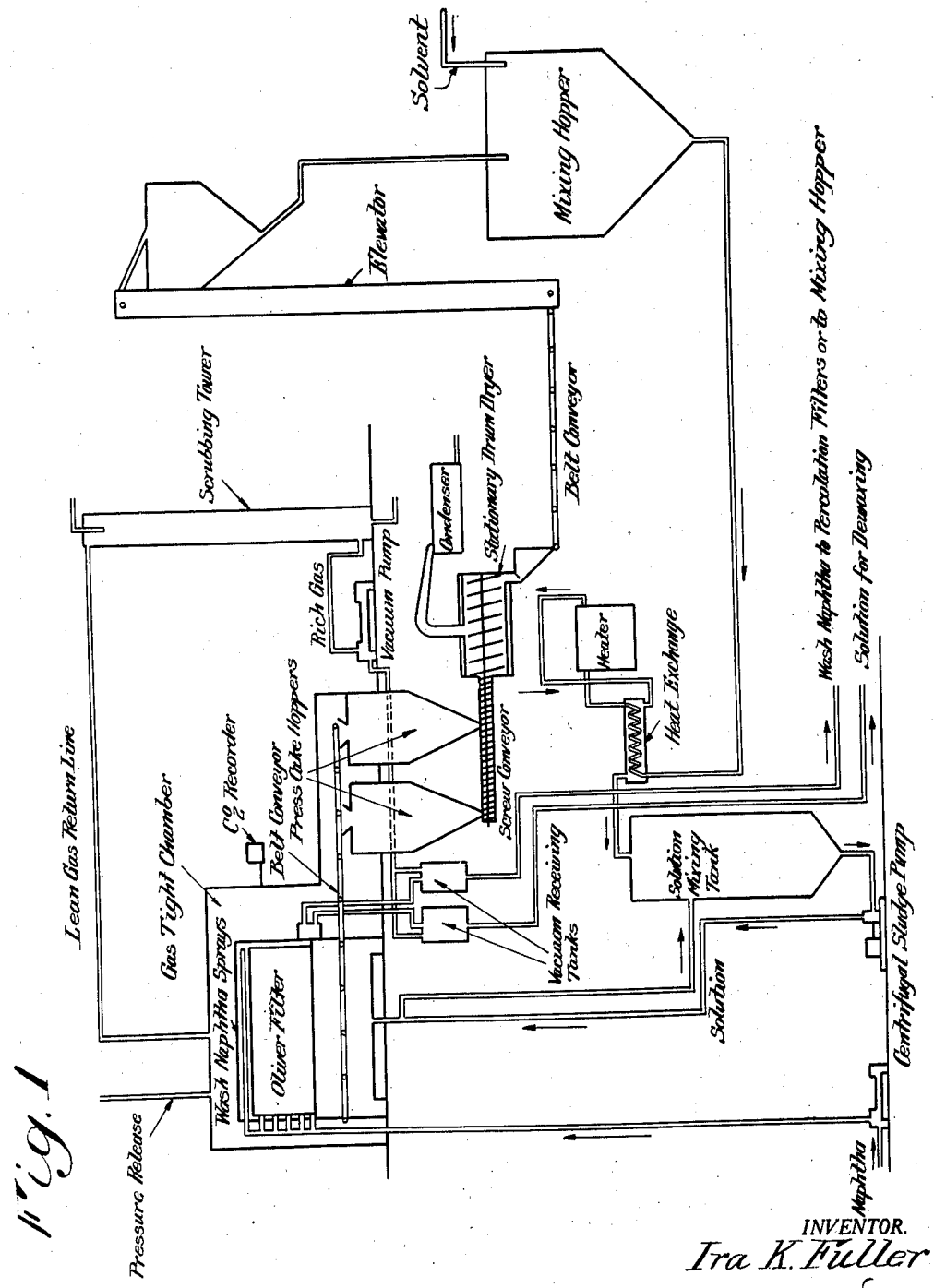

INVENTOR.
Ira K. Fuller
BY
his ATTORNEY.

Patented Dec. 6, 1932

1,890,255

UNITED STATES PATENT OFFICE

IRA K. FULLER, OF OLEAN, NEW YORK, ASSIGNOR, BY MESNE ASSIGNMENTS, TO CONTACT FILTRATION COMPANY, A CORPORATION OF CALIFORNIA

PROCESS OF TREATING SPENT ADSORBENTS

Application filed September 27, 1929. Serial No. 395,595.

This invention relates particularly to the treatment of adsorbents, such as activated clay, which have been used in decolorizing oil. Such material, after separation from the bulk of the treated oil, still contains a certain amount of oil which cannot be removed from it in the filtering operation, and its activity has been lost through adsorption of the gummy or resinous coloring matter which it is its function to remove from the oil. To save the residual oil and restore the utility of the clay, it is desirable to first remove the oil, by the use of a suitable solvent, and thereafter to remove the adsorbed matter by a solvent adapted for this purpose.

The object of this invention is to provide a process, for the purpose described, in which the removal of adsorbed matter from the adsorbent or clay may be accomplished with economy, but with such completeness that a burning operation, for the purpose of reactivation, may be dispensed with, or if used, will not involve contamination of the clay with residues of combustion.

I have found that the desired result may be secured by washing the adsorbed material from the clay by a process which involves the step of first mixing the clay with enough solvent to bring substantially all of the adsorbed matter into solution, heating and agitating the mixture until solution is practically complete, filtering the clay from the mixture, and then washing, from the filter cake, the small amount of solution remaining therein, by percolating through the cake an additional amount of fresh solvent.

The complete process may be carried out in a plant comprising two substantially similar sets of apparatus for performing the two respective operations of oil removal and reactivation, and in the accompanying drawings Fig. 1 is a flow sheet representing the oil-removal apparatus, and Fig. 2 represents the reactivating apparatus.

Beginning in Figure 1 with the mixing hopper, the spent adsorbent to be reactivated is mixed with a solvent for the oil, this solvent being conveniently and preferably gasoline of low aromatic content such as that obtained in the distillation of Pennsylvania crude. The mixture of gasoline and spent adsorbent ("clay") is passed to a heater by way of a heat exchanger, this heat exchanger preheating the incoming mixture through thermal contact with the heated mixture issuing from the heater. The heater may be a tube still or any other convenient type of continuous heater, in which the mixture of clay and solvent is constantly agitated during the heating. The clay-solvent mixture is heated until solution of the oil, as shown by trial, is complete. The mixture then passes to an agitating or solution mixing tank, where it is further agitated.

The mixture next passes to a filter-press of standard construction, the type designated on the drawings being known as the "Oliver" press, although any type may be employed. The "Oliver" press comprises a tank or liquid-tight receptacle, in which there is placed a revolving drum carrying the filter cloth, the drum being so positioned that it is partially immersed in the liquid being filtered. The drum is divided into a number of compartments, and is connected with a vacuum in such manner that the compartments will be successively exhausted and the liquid drawn through the filter cloth by the suction the solid matter originally suspended in the liquid being deposited upon the exterior surface of the drum as a cake, which is removed by a stationary scraper mounted adjacent to the drum.

The press cake, freed from entrained oil but still containing gasoline is conveyed to hoppers. From these hoppers it is taken to a dryer, which preferably is of a stationary drum type, and heated by a convenient source of heat. The vapors from the dryer are condensed and the residual gasoline in the cake thus recovered.

The dried clay, discharged from the dryer through a suitable hopper or valve to trap any vapor, is ready for reactivation.

For this purpose apparatus as outlined on Figure 2 is employed, this apparatus being analogous to that of Fig. 1. The oil-freed clay is carried from the dryer of Fig. 1 to an elevator and then discharged into a mixing hopper where it is mixed with a reactivating solvent.

A number of solvents may be employed, as, for example, benzol, or a mixture of benzol with methyl-ethyl ketone. The mixture of gum solvent and clay passes through the heat exchanger (Figure 2), then through the heater, where the mixture is heated to facilitate the solution of the gums and resins, the incoming mixture of clay and gum solvent being preheated by thermal contact with the hot material issuing from the heater. The material from the heater, which now is composed of the clay substantially freed from its gum and resin content, together with the solvent and the gums and resins in solution, passes to a solution mixing tank, similar to that described before, where additional gum and resin solvent may be added if desired. From this tank, the mixture is transferred to a filter-press, which may be also, conveniently, of the "Oliver" type.

In order to carry out the present process this press is equipped with means for spraying solvent upon the cake formed in the press, and the suction boxes then act to draw the solvent through the cake, thus washing out the solution of adsorbed matter which would otherwise remain in the cake. By the use of a series of spray jets this action may be made so complete as to leave the clay practically free from soluble matter.

The washed clay cake is scraped from the drum and again conveyed to receiving hoppers, as previously described in connection with the oil extraction operation, then conveyed to a dryer, conveniently of the type described in connection with the extraction stage, the clay being dried, as before, by any convenient source of heat. As shown in Figure 2, from the dryer the activated clay is conveyed to an elevator, from which it is deposited and sent to storage.

What I claim as my invention and desire to secure by Letters Patent is:

1. A process for reactivating spent adsorbent from an oil contacting operation, which process comprises treating the adsorbent with an oil solvent for removal of oil, drying the adsorbent, mixing the dried adsorbent with a solvent for adsorbed matter, filtering the adsorbent from such mixture, and passing through the filter cake a further quantity of fresh solvent to wash the remaining solution of adsorbed matter therefrom.

2. A process for reactivating spent adsorbent from an oil contacting operation, which process comprises treating the adsorbent for removal of oil, mixing the adsorbent with a solvent for adsorbed matter and agitating and heating the mixture until solution is substantially complete, filtering the adsorbent from the mixture, and passing, through the filter cake, a further quantity of fresh solvent to wash the remaining solution of adsorbed matter therefrom.

IRA K. FULLER.